(12) United States Patent
Baruch et al.

(10) Patent No.: US 10,719,481 B1
(45) Date of Patent: Jul. 21, 2020

(54) MODIFICATION OF HISTORICAL DATA OF FILE SYSTEM IN DATA STORAGE ENVIRONMENT

(71) Applicant: EMC IP Holding Company LLC, Hopkinton, MA (US)

(72) Inventors: Leehod Baruch, Rishon Leziyon (IL); Assaf Natanzon, Tel Aviv (IL); Saar Cohen, Moshav Mishmeret (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 400 days.

(21) Appl. No.: 15/395,051

(22) Filed: Dec. 30, 2016

(51) Int. Cl.
*G06F 16/00* (2019.01)
*G06F 16/17* (2019.01)
*G06F 16/182* (2019.01)
*G06F 16/18* (2019.01)

(52) U.S. Cl.
CPC ........ *G06F 16/1734* (2019.01); *G06F 16/184* (2019.01); *G06F 16/1815* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,020,697 B1* | 3/2006 | Goodman | ............... | G06Q 10/10 709/223 |
| 7,467,198 B2* | 12/2008 | Goodman | ............... | G06Q 10/10 709/223 |
| 7,516,287 B2* | 4/2009 | Ahal | ............... | G06F 11/1471 711/162 |
| 7,526,508 B2* | 4/2009 | Tan | ............... | G06F 16/21 |
| 7,627,612 B2* | 12/2009 | Ahal | ............... | G06F 11/2066 |
| 8,171,065 B2* | 5/2012 | Slik | ............... | G06F 16/164 707/822 |
| 8,880,480 B2* | 11/2014 | Kundu | ............... | G06F 11/1471 707/682 |
| 9,563,521 B2* | 2/2017 | Panteleenko | | |
| 9,804,935 B1* | 10/2017 | Holenstein | ............... | G06F 11/1469 |
| 9,830,223 B1* | 11/2017 | Holenstein | ............... | G06F 11/1469 |
| 2007/0128899 A1* | 6/2007 | Mayer | ............... | G06F 9/4406 439/152 |
| 2008/0082770 A1* | 4/2008 | Ahal | ............... | G06F 11/1471 711/162 |
| 2008/0162590 A1* | 7/2008 | Kundu | ............... | G06F 11/1471 |
| 2008/0177994 A1* | 7/2008 | Mayer | ............... | G06F 9/4418 713/2 |
| 2009/0327854 A1* | 12/2009 | Chhajer | ............... | G06F 16/217 715/227 |

OTHER PUBLICATIONS

Wikipedia, Journaling File System, https://en.wikipedia.org/wiki/Journaling_file_system, Nov. 3, 2016, 7 pages.

\* cited by examiner

*Primary Examiner* — Farhan M Syed
(74) *Attorney, Agent, or Firm* — Ryan, Mason & Lewis, LLP (57) ABSTRACT

Access to historical data of a file system in a data storage environment is provided, wherein the historical data corresponds to one or more points in time occurring in the past. The historical data of the file system is modified, wherein the historical data comprises at least one of a component from a replica of the file system and an element of an activity log of the file system.

18 Claims, 6 Drawing Sheets

MODIFICATION OF HISTORICAL DATA OF FILE SYSTEM IN DATA STORAGE ENVIRONMENT

FIELD

The field relates generally to data storage environments, and more particularly to techniques which enable modification of a history of a file and/or folder in a file system.

BACKGROUND

Replication systems typically protect a primary data storage system (often called a production system or production site) by replicating the primary data storage system on a secondary data storage system (often called a replica system or replica site). The production site and the replica site are typically coupled by a communications network such as a wide area network (WAN).

A journal of a file system is a data structure that tracks or logs changes to or other activity in a file system, such as, for example, a file system of a production site. In the event of a system crash, or corruption of a file system due to, for example improper shutdown or startup procedures, hardware failures, and/or Network File System (NFS) write errors, the file system can be restored and/or inconsistencies repaired by reference to the journal. For example, a journal can be reviewed to find uncommitted transactions and a file system can be rolled back in time to changes made prior to these transactions. File system journals may keep track of one or more of stored metadata, stored data and related metadata.

SUMMARY

Embodiments of the disclosure provide techniques for providing access to and permitting modification of a history of a file and/or folder in a file system.

For example, in one embodiment, a method comprises the following steps. Access to historical data of a file system in a data storage environment is provided, wherein the historical data corresponds to one or more points in time occurring in the past. The historical data of the file system is modified, wherein the historical data comprises at least one of a component from a replica of the file system and an element of an activity log of the file system.

These and other illustrative embodiments include, without limitation, methods, apparatus, systems, and computer program products comprising processor-readable storage media.

DETAILED DESCRIPTION

At times, there may be a need or desire to delete certain information from a file system, such as, for example, files that may result in security risks or violations if discovered. Similarly, a user may want or need to change permissions and/or a location of a file. In order to effectively make these modifications, it is desirable that the deletions and changes extend beyond the production volume to, for example, copies and journals associated with the files and/or other information.

Conventionally, due to the read-only nature of points in time of a journal, there is no known method for performing these types of operations for specific files or folders without losing an entire history of a protected volume, especially if the protection is at the block level.

Advantageously, embodiments of the present disclosure provide techniques for providing access to the historical data of a file system in order to effectively rewrite a history of the data so that deletions of and/or changes to the data not only apply as of the time the deletions and/or changes are made, but also to every previous point in time that might be accessed from, for example, a replica or activity log including historical data. Historical data may correspond to points in time prior to a present point in time and/or prior to a point in time when the deletions of and/or changes to the data in the file system occurred.

Illustrative embodiments of the disclosure will be described herein with reference to exemplary data storage environments and associated production and replica sites, data backup systems, processing platforms and processing devices. It is to be appreciated, however, that the embodiments are not restricted to use with the particular illustrative system and device configurations shown. Moreover, the term "data storage environment" as used herein is intended to be broadly construed, so as to encompass, for example, multi-site data centers, private or public cloud computing systems, grid computing systems, computing clusters, high performance computer systems or storage systems, as well as other types of systems comprising distributed information technology infrastructure.

Figure 1:
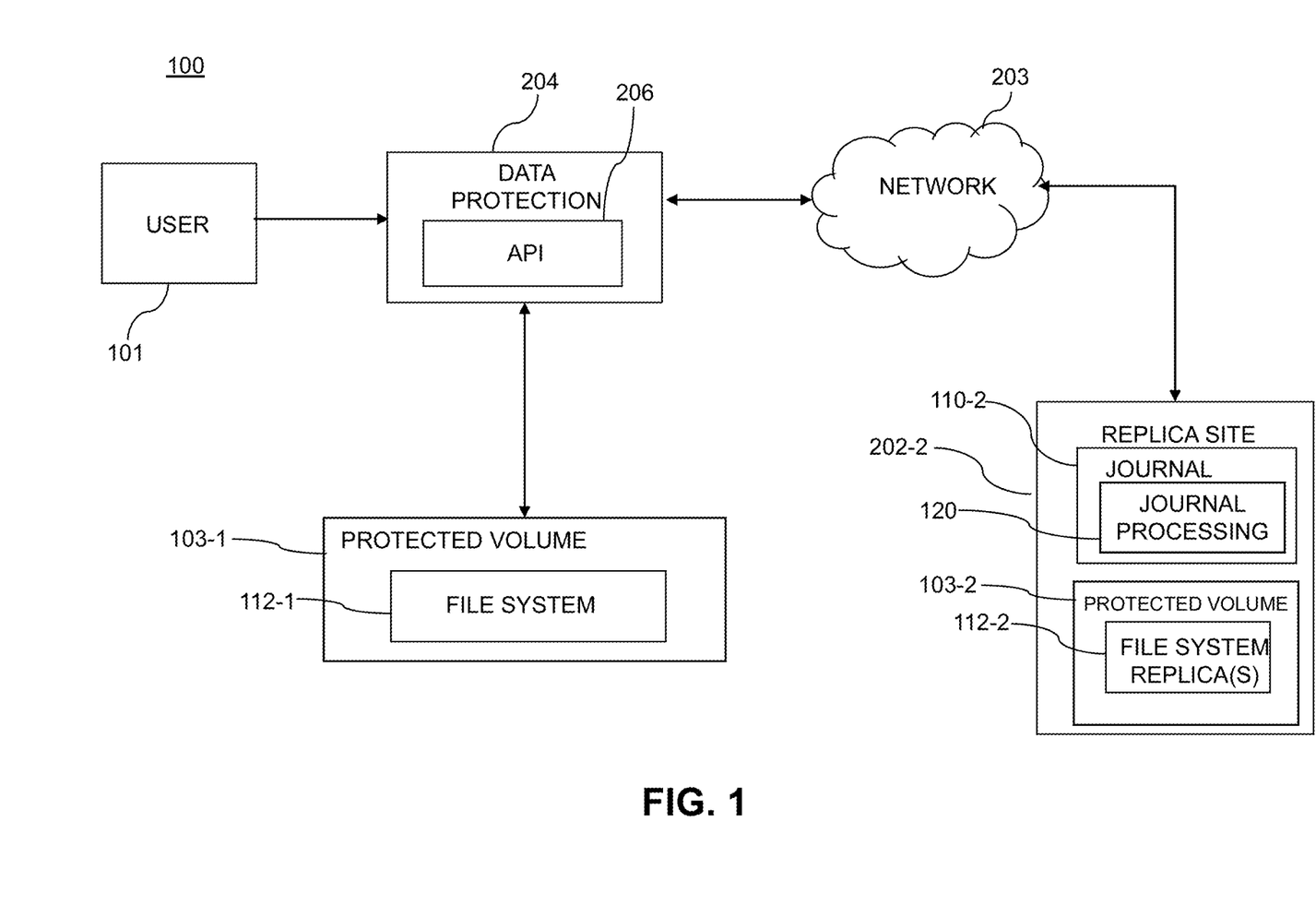
FIG. 1 illustrates a data storage environment with a replica file system and a journal component which are accessible to modify a history of a file system, according to an embodiment of the disclosure.

The example embodiment of FIG. 1 illustrates a data storage environment 100 with a replica file system 112-2 in a replica protected volume 103-2 and a journal component 110-2 which are accessible to modify a history of a file system 112-1, according to an embodiment of the disclosure. As mentioned above, illustrative embodiments enable access to the historical data of a file system via, for example, a replica file system or activity log, in order to effectively rewrite a history of the data so that deletions of and/or changes to the data apply to previous points in time that might be accessed by a user. More particularly, as shown in FIG. 1, a user 101, such as a system administrator, via, for example, a computing device having a processor and a memory, accesses a history modification application programming interface (API) 206 of a data protection system 204. In certain embodiments, the user 101 interacts directly with the API 206 that is within the data protection system 204. In accordance with an embodiment of the disclosure, the protection system 204 exposes the API 206 to perform irreversible alterations or deletions of the history of a file or a folder of the data storage environment 100. Alternatively, an embodiment can provide for a mechanism to reverse the operations on the history if desired. The protection system 204 can be operatively connected to the replica file system 112-2 and the journal component 110-2 via, for example, a network 203, such as the Internet, a wide area network (WAN), a local area network (LAN), a software defined network (SDN), a satellite network, a telephone or cable network, a cellular network, a wireless network such as WiFi or WiMAX, a network comprising virtual network switches, or various portions or combinations of these and other types of networks.

In accordance with the embodiment of FIG. 1, the API 206 is secure due to its sensitive operation because unauthorized access to the API 206 or a mistake in some command(s) may result in permanent loss of history. Once a request to modify the history of a file system 112-1 is made by a user, the protection system 204 can access data at a replica file system 112-2 or journal 110-2 (also referred to herein as an activity log), including, but not necessarily limited to, files, folders, images, snapshots and continuous data streams, and apply the requested changes. As explained in more detail herein, the journal 110-2 can include a journal processing module 120 to apply requested changes to one or more elements of a journal 110-2. In order to perform the requested operations on the history of the file system, the block protection system is aware of the internals of the file system that resides on a volume of data that is being protected. The user 101 may access the API 206 to be connected to the protection system 204 by, for example, a computing device connected to network connections such as, but not necessarily limited to, Internet, a WAN, a LAN, a software defined network (SDN), a satellite network, a telephone or cable network, a cellular network, a wireless network such as WiFi or WiMAX, a network comprising virtual network switches, or various portions or combinations of these and other types of networks.

In some embodiments, a "file system" may include a system that an operating system employs to store and access data within a data storage environment. The file system may comprise different methods and data structures designed to read data from and write data to (i.e., store in, retrieve from, or otherwise access) one or more storage devices in the data storage environment. A file system may comprise various file types such as, for example, text, image, video, executable, library and shared object files. Data blocks and data files are non-limiting illustrative data formats to which the embodiments of the disclosure may be applied. A file system (e.g., file system 112-1) can be part of a protected volume of data (e.g., protected volume 103-1).

In some embodiments, "metadata" or "file system metadata" may include a file type (e.g., text, image, video, executable, library and shared object files), a file size, a file name, a file date, and a file location (e.g., directory) of one or more files of a file system.

Figure 2:
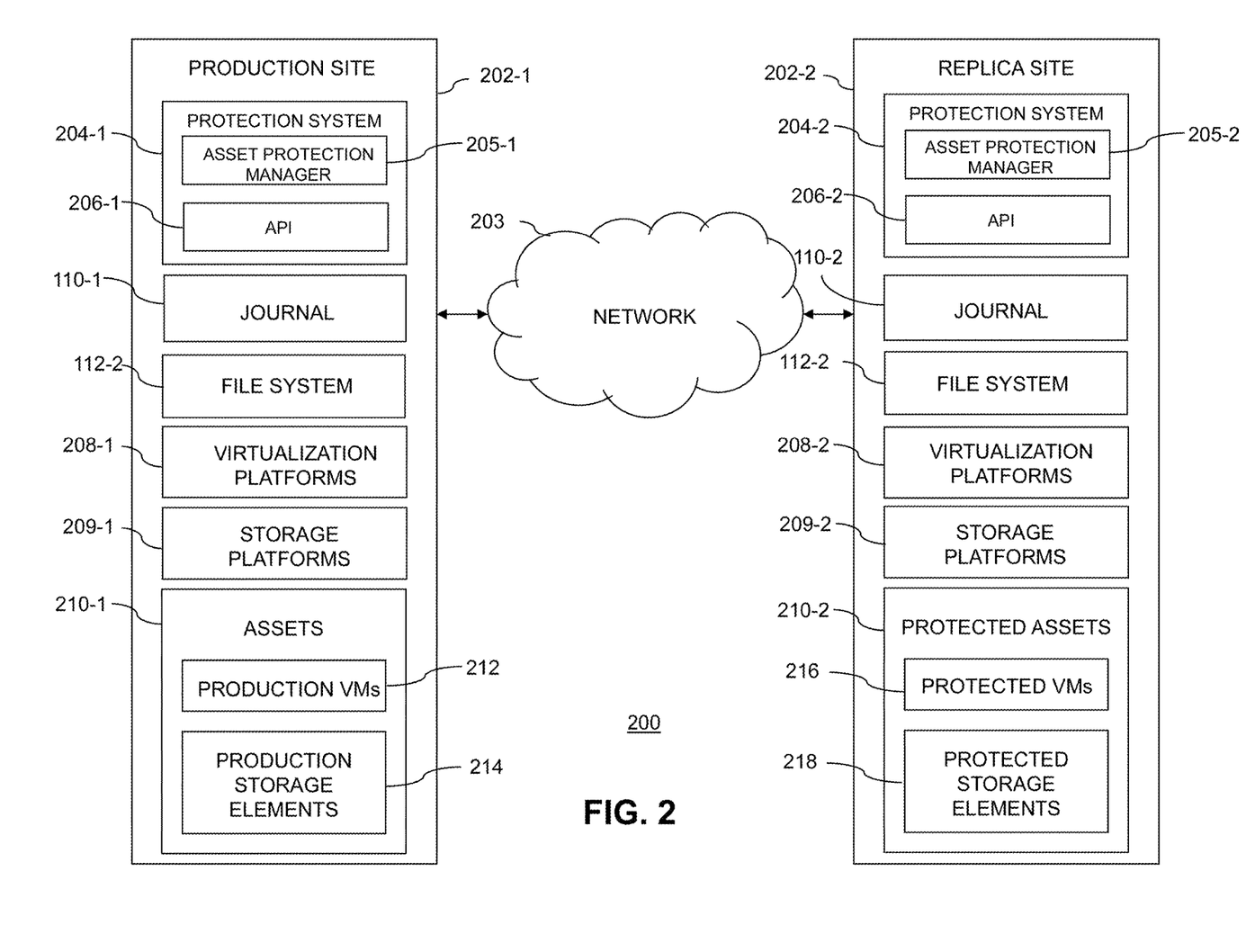
FIG. 2 illustrates a data storage environment comprising a replication system, wherein replica file systems and journal components are accessible to modify a history of a file system, according to an embodiment of the disclosure.

In certain embodiments, the locations of a journal component, file system replica and protection system within the data storage environment depends on the nature and configuration of the data storage environment. For example, referring to the example embodiment of FIG. 1, the data storage environment 100 may comprise a replication system, a data backup system, or some combination of both. In such cases, the journal component, file system replica and protection system are implemented in one or more locations within the replication system or data backup system where it is functionally needed or where it is most functionally efficient. By way of example, the example embodiment of FIG. 2 illustrates the journal component, file system replica and protection system in a replication system architecture. It is to be understood that the journal component, file system replica and protection system can be implemented in alternative data storage system architectures other than that shown in FIG. 2. In addition, the journal component, file system replica and protection system may be implemented in more than one location within a data storage environment. One of ordinary skill in the art will realize alternative implementations of the historical data modification techniques described herein.

Turning now to the example embodiment of FIG. 2, a data storage environment 200 is illustrated comprising a replication system, wherein replica file systems and journal components are accessible to modify a history of a file system, according to an embodiment of the disclosure. In this illustrative embodiment, the journal component, file system replica and protection system as discussed in connection with the example embodiment of FIG. 1, are depicted as being implemented within data storage environment 200 as journal component 110-1, 110-2, file system replica 112-2 and protection system 204-1, 204-2 respectively. Data storage environment 200 depicts a block device replication system. In accordance with illustrative embodiments, such a replication system is configured to understand the file system that is being replicated within a protected block device.

For example, in accordance with illustrative embodiments, access to historical data of a file system 112-1 in a data storage environment 200 is provided to a user 101 via an API 206-1 at a production site 202-1. Alternatively, the access can be provided via API 206-2 at a replica site 202-2. The historical data corresponds to one or more points in time occurring in the past prior to a present point in time and/or prior to a point in time when the deletions of and/or changes to the data in the file system occurred. The historical data of the file system 112-1 can include a component of a replica of the file system. The accessed replica can be a local copy of the file system 112-1 located at the production site 202-1 and/or the file system replica 112-2 located at the replica site 202-2. Components of the replica file system can include, for example, files and/or folders.

In certain embodiments, the historical data can also include an element of an activity log (e.g., journal) of the file system. The journal 110-1, 110-2 can be at the production and/or replica site 202-1, 202-2. Elements of the activity log can include for example, do and undo data streams of continuous replication and/or a set of snapshots. If the journal 110-1 and/or 110-2 includes do and undo data streams of continuous replication, the journal processing module 120 could find an earliest point in time for which the requested changes to the file system 112-1 are relevant, make the changes at the stream(s) corresponding to the earliest point in time, and then roll forward the time to a present time or to the time of the change to the file system 112-1 to ensure that the change is not undone.

If the journal 110-1, 110-2 is a set of snapshots, in accordance with an illustrative embodiment, changes can be applied to every snapshot separately. Alternatively, assuming that each snapshot represents differences from a previous snapshot, once a base snapshot that contains a modified file has been changed, the snapshots after the base snapshot also include the modification. More specifically, referring to the example embodiment of FIG. 3, which is a snapshot diagram 300 illustrating alteration of connected snapshots of a journal, according to an embodiment of the disclosure, a deletion of FileA is made at snapshot C 314, and applies to subsequent snapshots D . . . N 316, 318, where N is a last snapshot. In this instance, a decision has been made to delete FileA starting from snapshot C, so that snapshots A and B 310, 312 still include FileA. Alternatively, the FileA may be separately deleted from snapshots A and B 310, 312, or from the earliest snapshot from which it occurs (snapshot A 310) and applied to subsequent snapshots B through N. For example, in the case of snapshot B' 322, the earliest snapshot for which a file appears (in this case FileB') is determined, and the file is deleted from the earliest snapshot and subsequent snapshots. FileB' first appears at snapshot B' 322, is deleted from snapshot B' 322, and from the subsequent snapshots C' 324, D'326 through N' 328, where N' is the last snapshot. Snapshot A' 320 is not modified. While deletions are shown in the example embodiment of FIG. 3, it is to be understood that other modifications, such as, for example, changes in permission, changes in location, and changes of content can be similarly managed.

The data storage environment 200 in the example embodiment of FIG. 2 comprises a production site 202-1 that communicates with a replica site 202-2 over a network 203. The production and replica sites 202 are examples of what are more generally referred to herein as respective first and second sites of a data storage environment. Numerous other types and arrangements of multiple sites may be used in other embodiments, and such sites may be configured to implement similar functionality. For example, although site 202-1 is shown as a production site relative to replica site 202-2 in this embodiment, site 202-1 may additionally serve as a replica site relative to site 202-2 operating as a production site. In addition, a given one of the sites 202-1 or 202-2 may be configured to serve as a replica site for each of multiple production sites of a data storage environment.

Referring to the example embodiment of FIG. 2, the network 203 may comprise, for example, a global computer network such as the Internet, a WAN, a LAN, an SDN, a satellite network, a telephone or cable network, a cellular network, a wireless network such as WiFi or WiMAX, a network comprising virtual network switches, or various portions or combinations of these and other types of networks.

It is assumed in this exemplary discussion that site 202-2 replicates functions, processes, structures, modules and assets of site 202-1 for purposes of protecting site 202-1 from loss, corruption, and/or failure by providing redundancy. Thus, as is shown, site 202-2 comprises the same or similar functions, processes, structures, modules and assets as site 202-1, as will be further explained below.

The sites 202-1 and 202-2 comprise respective protection systems 204-1 and 204-2 implementing respective asset protection managers 205-1 and 205-2. It is understood that the asset protection manager 205-1 operates in conjunction with asset protection manager 205-2 to replicate functions, processes, structures, modules and assets of site 202-1 on site 202-2. The asset protection managers 205-1 and 205-2, although shown as elements of the protection systems 204-1 and 204-1 in the present embodiment, may in other embodiments be implemented at least in part using an external controller, that is, a controller that is external to one or both of the sites 202-1 and 202-2.

Also shown as part of the protection systems 204-1 and 204-2 are APIs 206-1 and 206-2. Such APIs can alternatively be implemented separate from the protection systems. As mentioned above, in this example embodiment, API 206-1 is considered an implementation of API 206 shown in FIG. 1. API 206-2 can be considered a replica of API 206-1. Additionally or alternatively, the API 206-2 can itself be considered an implementation of API 206 of FIG. 1 when the replica site 202-2 is itself being replicated at another site.

In certain embodiments, file system 112-2 can be considered a replica of file system 112-1. Journal component 110-2 can be considered a replica of journal component 110-1.

The sites 202-1 and 202-2 further comprise respective virtualization platforms 208-1 and 208-2, each of which may comprise one or more hypervisors. An example of a commercially available virtualization platform that may be used in one or more embodiments of the disclosure is the VMware® vSphere™ which may have an associated virtual infrastructure management system such as the VMware® vCenter™. Other types of virtualization platforms that may be used include Microsoft Hyper-V Server.

Referring back to the example embodiment of FIG. 2, the sites 202-1 and 202-2 also comprise respective storage platforms 209-1 and 209-2. These storage platforms may be implemented, for example, using storage products such as VNX and Symmetrix VMAX, both commercially available from Dell EMC Corporation of Hopkinton, Mass. A variety of other products may be utilized to implement at least a portion of the storage platforms 209-1 and 209-2. For example, storage platform functionality may be incorporated within a virtualization platform product.

Referring back to the example embodiment of FIG. 2, the protection systems 204-1 and 204-2 may be implemented at least in part using respective hypervisors of the virtualization platforms 208-1 and 208-2, respectively, and/or the storage platforms 209-1 and 209-2, respectively, of the production and replica sites.

Associated with the production site 202-1 are complex assets 210-1 that illustratively include production virtual machines (VMs) 212 and production storage elements 214. The replica site 202-2 comprises corresponding complex assets 210-2 that include protected virtual machines 216 corresponding to respective ones of the production virtual machines 212 and protected storage elements 218 corresponding to respective ones of the production storage elements 214. These virtual machines 216 and storage elements 218 may typically be referred to as respective "ghost" elements prior to bringing at least a portion of them into a fully operational status in conjunction with recovery of a failure in one of the corresponding complex assets 210-1 of the production site 202-1.

As will be described in greater detail below, in the example embodiment of FIG. 2, the protection systems 204-1 and 204-2, and their associated asset protection managers 205-1 and 205-2, are utilized in configuring the virtual machines 216 and storage elements 218 of the replica site in a manner that facilitates recovery from a failure in one of the complex assets 210-1 of the production site. The protection systems 204-1 and 204-2 may each run on a computer, server or other processing platform element, which may be viewed as an example of what is more generally referred to herein as a "processing device."

Figure 4:
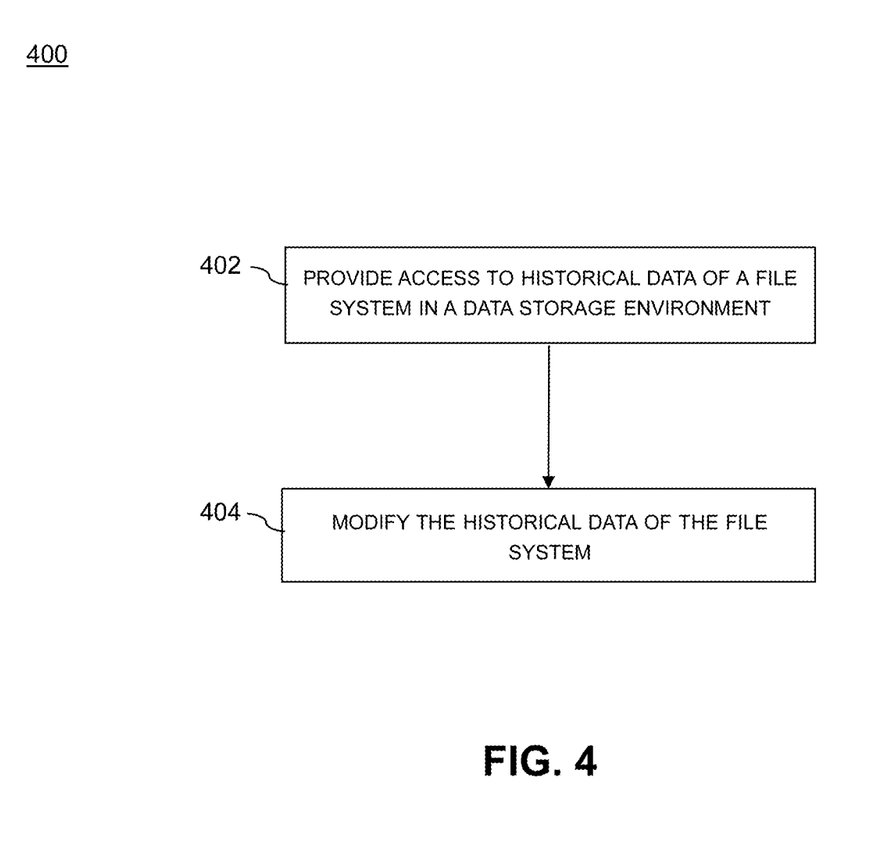
FIG. 4 illustrates a methodology for accessing and modifying a history of a file system, according to an embodiment of the disclosure.

Turning now to the example embodiment of FIG. 4, a methodology 400 is illustrated for accessing and modifying a history of a file system, according to an embodiment of the disclosure. The flow diagram in FIG. 4 summarizes main steps of the methodology. More particularly, as shown, at step 402 access is provided to historical data of a file system in a data storage environment. The historical data corresponds to one or more points in time occurring in the past. Then, step 404 modifies the historical data of the file system. The historical data comprises at least one of a component from a replica of the file system and an element of an activity log of the file system. The access is provided through an API operatively linked to the replica of the file system and the activity log. At least a portion of the file system is part of a protected volume of data, wherein protection for the protected volume can be performed at a block level.

In accordance with an illustrative embodiment of the present disclosure, the modifying is not performed until the historical data of the file system is accessed by a user. For example, referring back to the example embodiment of FIG. 1, the protection system 204 can be programmed to store requested changes to historical data applied through the API 206, and apply the changes only when the historical data is accessed. The requested changes are marked at the protection system 204 under the assumption that access to the historical data will be mediated by the protection system 204, and is not directly through a storage array. As a result, with this approach, modifications to the historical data do not have to occur in the journal, but are applied only to data that is exposed by the protection system 204 when the data is accessed. Accordingly, the modifications are only applied once the data corresponding to the previous points in time is accessed.

According to some embodiments, the modifying of the historical data may comprise altering first data of an activity log corresponding to a point in time occurring in the past and pertaining to a given transaction performed on at least one of a file and a folder of the data storage environment. The first data may be in the form of a snapshot. In some embodiment, the transaction may be, for example, a deletion, change in location, change in permission or change in content. The alteration of the first data can be applied to any remaining data of the activity log corresponding to remaining points in time occurring in the past and pertaining to the given transaction.

In accordance with some embodiments, a first snapshot or portion of a continuous data stream corresponding to an earliest point in time occurring in the past and pertaining to a given transaction performed on at least one of a file and a folder of the data storage environment is determined. The first snapshot can be altered, wherein the alteration is automatically applied to subsequent snapshots of the activity log corresponding to subsequent points in time occurring in the past and pertaining to the given transaction. The first portion of the data stream can be altered, wherein the alteration is applied to subsequent portions of the data stream by rolling forward the earliest point in time to a current time.

Figure 3:
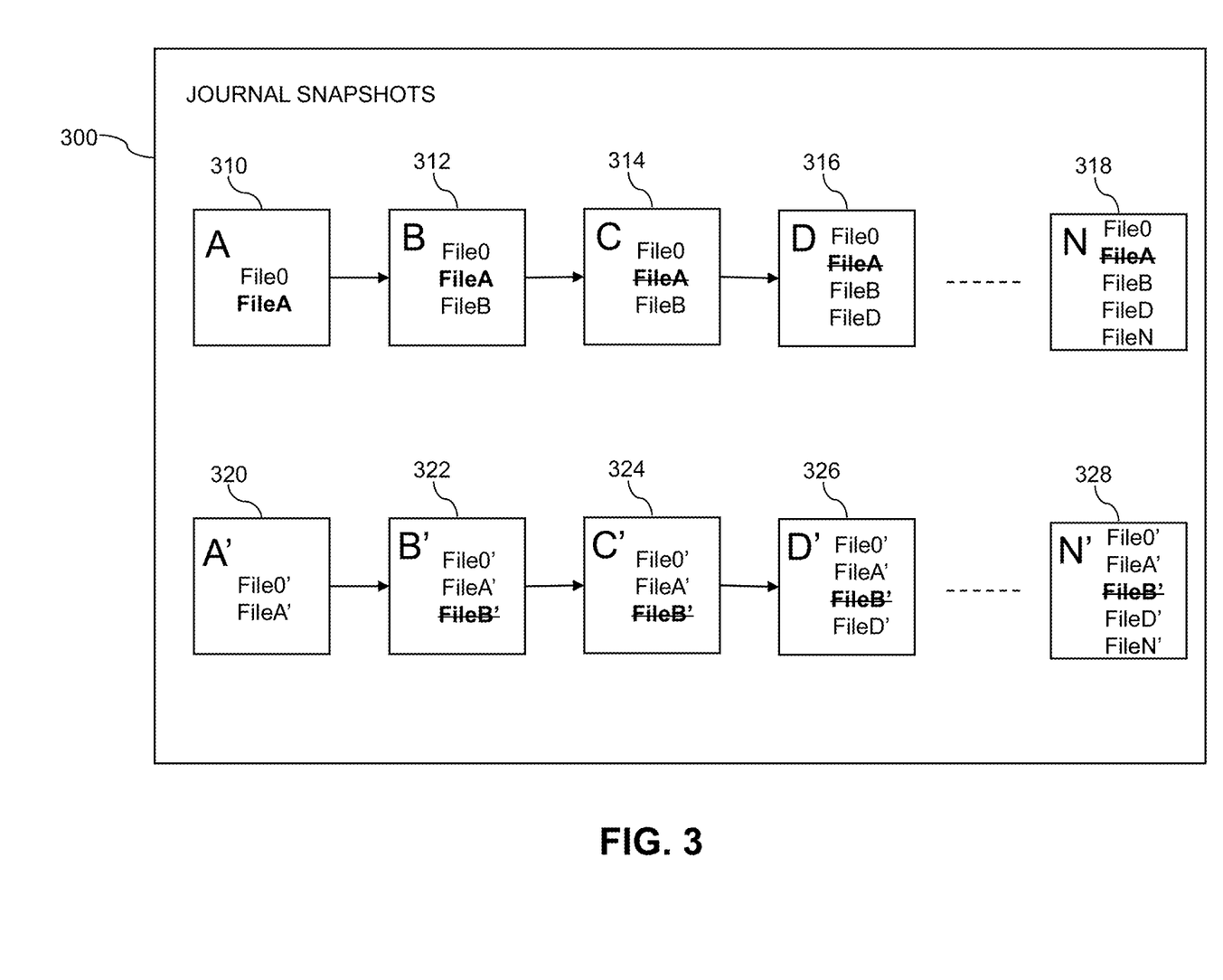
FIG. 3 illustrates alteration of connected snapshots of a journal, according to an embodiment of the disclosure.

As mentioned previously, at least portions of the data storage environments shown in FIGS. 1-3 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to an executed on or across a portion of one or more virtual or physical processors.

Figure 5:
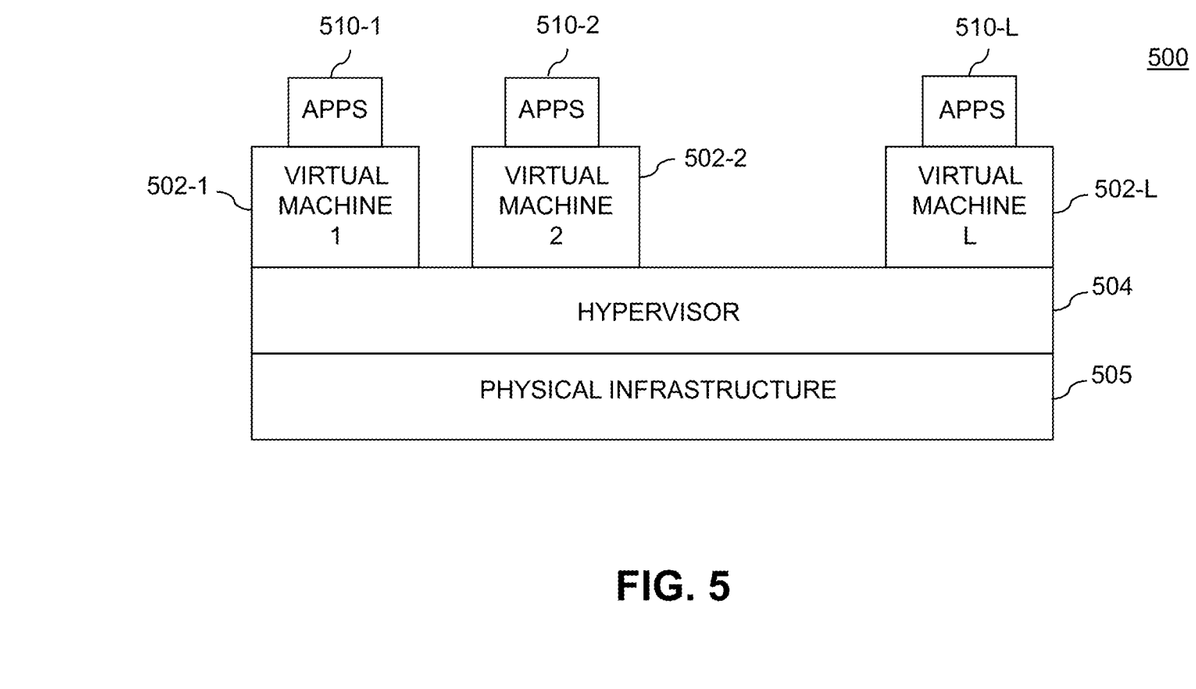
FIGS. 5 and 6 show examples of processing platforms that may be utilized to implement at least a portion of a data storage environment in illustrative embodiments.

Illustrative embodiments of such platforms will now be described in greater detail in conjunction with FIGS. 5 and 6. The example embodiment of FIG. 5 shows an example processing platform comprising cloud infrastructure 500. The cloud infrastructure 500 comprises a combination of physical and virtual processing resources that may be utilized to implement at least a portion of the data storage environments. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

These and other types of cloud infrastructure can be used to implement one or more system components, such as journal component 110-1, file system 112-1, API 206 and other components shown in FIGS. 1-3, and combinations or portions thereof, in a given embodiment.

Although only a single hypervisor 504 is shown in the embodiment of FIG. 5, the data storage environment may of course include multiple hypervisors each providing a set of virtual machines using at least one underlying physical machine. Different sets of virtual machines provided by one or more hypervisors may be utilized in configuring multiple instances of various components of the data storage environment.

An example of a commercially available hypervisor platform that may be used to implement hypervisor 504 and possibly other portions of the data storage environment 100 in one or more embodiments of the disclosure is the VMware® vSphere® which may have an associated virtual infrastructure management system such as the VMware® vCenter™. The underlying physical machines may comprise one or more distributed processing platforms that include one or more storage systems.

In certain embodiments, such storage systems may comprise any of a variety of different types of storage including network-attached storage (NAS), storage area networks (SANs), direct-attached storage (DAS) and distributed DAS, as well as combinations of these and other storage types, including software-defined storage.

In some embodiments, particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, Data Domain® storage systems, all from Dell EMC of Hopkinton, Mass. In many embodiments, combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the data storage environment.

As is apparent from the above, one or more of the processing modules or other components of the data storage environments shown in FIGS. 1-3 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 6:
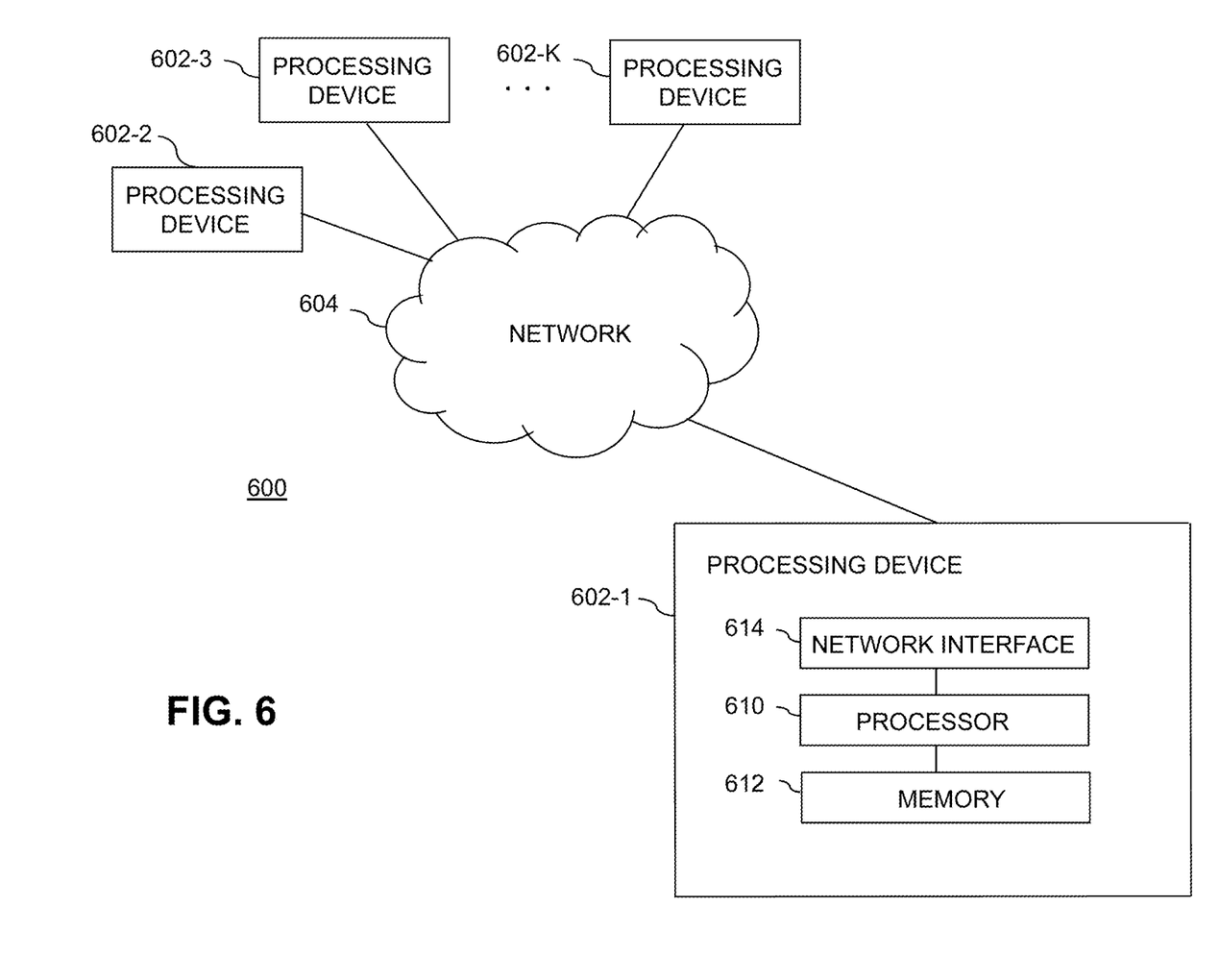

Also included in the processing device 602-1 of the example embodiment of FIG. 6 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the data storage environments, although in other embodiments a given tenant can have multiple containers. The containers may be utilized to implement a variety of different types of functionality within the data storage environments. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the data storage environments. Such components can communicate with other elements of the data storage environments over any type of network or other communication media.

As indicated previously, in some embodiments, components of a data storage environment as disclosed herein can be implemented at least in part in the form of one or more software programs stored in memory and executed by a processor of a processing device. For example, at least portions of a journal component, protection system and file system or other data storage environment components are illustratively implemented in one or more embodiments the form of software running on a processing platform comprising one or more processing devices.

For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

It should again be emphasized that the above-described embodiments of the disclosure are presented for purposes of illustration only. Many variations and other alternative embodiments may be used. For example, the disclosed techniques are applicable to a wide variety of other types of data storage environments. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
providing access to historical data of a file system in a data storage environment, wherein the historical data corresponds to one or more points in time occurring in the past; and
modifying the historical data of the file system, wherein the historical data comprises at least one of a component from a replica of the file system and an element of an activity log of the file system;
the step of modifying comprising altering at least a portion of the historical data of the file system corresponding to a point in time occurring in the past and pertaining to a given transaction, and applying the alteration at one of past and subsequent points in time;
the step of providing access to the historical data is comprises utilizing an application programming interface of a data protection system, the application programming interface operatively linked to the replica of the file system and the activity log and accessible to a user;
the step of modifying includes the user interacting with the application programming interface to initiate a request for the altering of the at least a portion of the historical data of the file system;
enabling storage of the request at the data protection system;
wherein the altering, responsive to the stored request, is performed upon access of the historical data of the file system by the user;
wherein the element of the activity log comprises a snapshot, and wherein the step of modifying further comprises:
altering the snapshot corresponding to a point in time occurring in the past and pertaining to a given transaction performed on at least one of a file and a folder of the data storage environment; and
applying the alteration of the snapshot to remaining snapshots of the activity log corresponding to remaining points in time occurring in the past and pertaining to the given transaction; and
wherein the method is implemented by one or more processing devices each comprising a processor coupled to a memory.

2. The method of claim 1, wherein:
the data storage environment comprises a replication system comprising a production site and a replica site operatively coupled by a communications network;
at least one of the production site and the replica site comprises the replica of the file system; and
at least one of the production site and the replica site comprises the activity log.

3. The method of claim 1, wherein the activity log comprises a journal including one of a continuous data stream and storage snapshots.

4. The method of claim 1, wherein at least a portion of the file system is part of a protected volume of data.

5. The method of claim 4, wherein protection for the protected volume is performed at a block level.

6. The method of claim 1, wherein the step of modifying comprises at least one of a deletion, a change in permission, a change in location, and a change of content.

7. The method of claim 1, wherein the step of modifying further comprises:
altering first data of the activity log corresponding to a point in time occurring in the past and pertaining to a given transaction performed on at least one of a file and a folder of the data storage environment; and
applying the alteration of the first data to remaining data of the activity log corresponding to remaining points in time occurring in the past and pertaining to the given transaction.

8. The method of claim 1, wherein the step of modifying further comprises:
determining a first snapshot of the activity log corresponding to an earliest point in time occurring in the past and pertaining to a given transaction performed on at least one of a file and a folder of the data storage environment; and
altering the first snapshot, wherein the alteration of the first snapshot is automatically applied to subsequent snapshots of the activity log corresponding to subsequent points in time occurring in the past and pertaining to the given transaction.

9. The method of claim 1, wherein the element of the activity log comprises a continuous data stream, and wherein the step of modifying further comprises:
determining a first portion of the data stream corresponding to an earliest point in time occurring in the past and pertaining to a given transaction performed on at least one of a file and a folder of the data storage environment;
altering the first portion of the data stream; and
applying the alteration of the first portion of the data stream to subsequent portions of the data stream by rolling forward the earliest point in time to a current time.

10. The method of claim 9, wherein the component from the replica of the file system comprises one of a file and a folder.

11. A computer program product comprising a non-transitory processor-readable storage medium having stored therein program code of one or more software programs, wherein the program code when executed by at least one processing device causes said at least one processing device to:
provide access to historical data of a file system in a data storage environment, wherein the historical data corresponds to one or more points in time occurring in the past; and
modify the historical data of the file system, wherein the historical data comprises at least one of a component from a replica of the file system and an element of an activity log of the file system;
wherein modifying comprises altering at least a portion of the historical data of the file system corresponding to a point in time occurring in the past and pertaining to a given transaction, and applying the alteration at one of past and subsequent points in time;

wherein the access to the historical data is provided through an application programming interface of a data protection system, the application programming interface operatively linked to the replica of the file system and the activity log and accessible to a user;

wherein the modifying includes the user interacting with the application programming interface to initiate a request for the altering of the at least a portion of the historical data of the file system;

wherein the request is stored at the data protection system;

wherein the altering, responsive to the stored request, is performed upon access of the historical data of the file system by the user;

wherein the element of the activity log comprises a snapshot, and wherein in modifying the historical data of the file system, the at least one processing device is further configured to:

alter the snapshot corresponding to a point in time occurring in the past and pertaining to a given transaction performed on at least one of a file and a folder of the data storage environment; and     apply the alteration of the snapshot to remaining snapshots of the activity log corresponding to remaining points in time occurring in the past and pertaining to the given transaction.

12. An apparatus comprising:

at least one processor coupled to a memory and configured to:

provide access to historical data of a file system in a data storage environment, wherein the historical data corresponds to one or more points in time occurring in the past; and modify the historical data of the file system, wherein the historical data comprises at least one of a component from a replica of the file system and an element of an activity log of the file system;

wherein modifying comprises altering at least a portion of the historical data of the file system corresponding to a point in time occurring in the past and pertaining to a given transaction, and applying the alteration at one of past and subsequent points in time;

wherein the access to the historical data is provided through an application programming interface of a data protection system, the application programming interface operatively linked to the replica of the file system and the activity log and accessible to a user;

wherein the modifying includes the user interacting with the application programming interface to initiate a request for the altering of the at least a portion of the historical data of the file system;

wherein the request is stored at the data protection system;

wherein the altering, responsive to the stored request, is performed upon access of the historical data of the file system by the user; and wherein the element of the activity log comprises a snapshot, and wherein in modifying the historical data of the file system, the at least one processor is further configured to:

alter the snapshot corresponding to a point in time occurring in the past and pertaining to a given transaction performed on at least one of a file and a folder of the data storage environment; and     apply the alteration of the snapshot to remaining snapshots of the activity log corresponding to remaining points in time occurring in the past and pertaining to the given transaction.

13. The apparatus of claim 12, wherein:

the data storage environment comprises a replication system comprising a production site and a replica site operatively coupled by a communications network;

at least one of the production site and the replica site comprises the replica of the file system; and at least one of the production site and the replica site comprises the activity log.

14. The apparatus of claim 12, wherein in modifying the historical data of the file system, the at least one processor is further configured to:

alter first data of the activity log corresponding to a point in time occurring in the past and pertaining to a given transaction performed on at least one of a file and a folder of the data storage environment; and     apply the alteration of the first data to remaining data of the activity log corresponding to remaining points in time occurring in the past and pertaining to the given transaction.

15. The apparatus of claim 12, wherein the element of the activity log comprises a snapshot, and wherein in modifying the historical data of the file system, the at least one processor is further configured to:

determine a first snapshot of the activity log corresponding to an earliest point in time occurring in the past and pertaining to a given transaction performed on at least one of a file and a folder of the data storage environment;

alter the first snapshot, wherein the alteration of the first snapshot is automatically applied to subsequent snapshots of the activity log corresponding to subsequent points in time occurring in the past and pertaining to the given transaction.

16. The apparatus of claim 12, wherein the element of the activity log comprises a continuous data stream, and wherein in modifying the historical data of the file system, the at least one processor is further configured to:

determine a first portion of the data stream corresponding to an earliest point in time occurring in the past and pertaining to a given transaction performed on at least one of a file and a folder of the data storage environment;

alter the first portion of the data stream; and apply the alteration of the first portion of the data stream to subsequent portions of the data stream by rolling forward the earliest point in time to a current time.

17. The computer program product of claim 11, wherein:

the data storage environment comprises a replication system comprising a production site and a replica site operatively coupled by a communications network;

at least one of the production site and the replica site comprises the replica of the file system; and at least one of the production site and the replica site comprises the activity log.

18. The computer program product of claim 11, wherein in modifying the historical data of the file system, the at least one processor is further configured to:

alter first data of the activity log corresponding to a point in time occurring in the past and pertaining to a given transaction performed on at least one of a file and a folder of the data storage environment; and     apply the alteration of the first data to remaining data of the activity log corresponding to remaining points in time occurring in the past and pertaining to the given transaction.

* * * * *